March 11, 1930. A. TORRIANI 1,750,068
EXPRESS COFFEE MACHINE SET
Filed Nov. 6, 1928
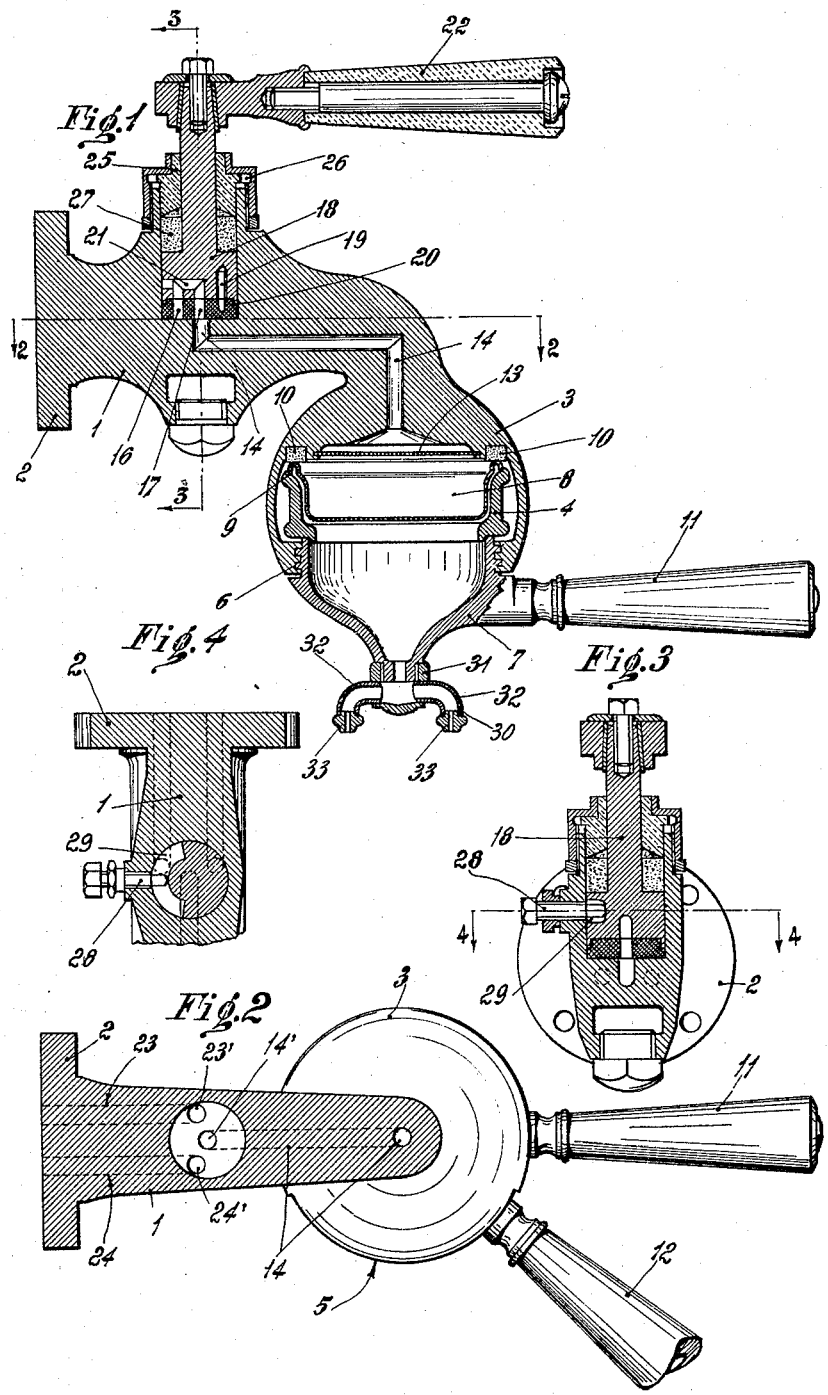
A. Torriani
INVENTOR
By Marks &Clerk
ATTYS Patented Mar. 11, 1930

1,750,068

UNITED STATES PATENT OFFICE

ANGELO TORRIANI, OF PAVIA, ITALY

EXPRESS COFFEE-MACHINE SET

Application filed November 6, 1928, Serial No. 317,631, and in Italy November 14, 1927.

The present invention relates to important improvements in express coffee machine sets, the object of said improvements being to render the working of the machine quicker and more certain and its construction more rational and at the same time to avoid any leakage of vapours and other inconveniences, as will appear from the following description and from the accompanying drawing. The drawing illustrates, by way of example only, a preferred execution form of the set forming the subject matter of the invention.

Fig. 1 shows the set in longitudinal section;

Fig. 2 shows the same set in cross section on the line 2—2 in Fig. 1;

Fig. 3 shows the set in cross section on 3—3 of Fig. 1;

Fig. 4 is a fragmentary plan section on 4—4 in Fig. 3.

The set body comprises an arm 1 fitted with flange 2 for attachment to the casing and terminating at the opposite end with a practically spherical cup 3 in which the ring-like filter-carrier 4 is mounted, the filter-carrier being adapted to be slid in and out through a window 5. As usual, the spherical cup 3 is provided with an internal screw-threading 6 for attachment of the collector 7, which is screw-threaded to suit.

The filter 8 is advantageously pressed out of a single metal-sheet; and at the top it is provided with a flange 9 making a tight joint with the packing 10 lodged in a recess formed in the spherical cup. The filter-carrier 4 is locked in place in the cup 3 by means of the collector 7 equipped with a handle 11; after sliding the carrier 4 into the cup 3 through the window 5 by means of the handle 12, the collector 7 is screwed into the cup 3 so as to force the carrier 4 against the packing 10.

13 is a wire net serving to divide the hot water supplied by the duct 14 and distribute it over the ground coffee contained in the filter 8. The opposite end of the duct 14 leads to a disc, in which holes 16 and 17 are formed, and made fast with the distributor 18 by means of a pin 19. In the top face of said disc a groove is formed for reception of a corresponding tongue provided on the bottom face of the distributor 18. A U-shaped duct 21 is formed in the distributor 18, which connects the two holes 16 and 17 with one another. As usual, the center hole 17 stands in permanent communication with the inlet 14′ of the duct 14, whereas the hole 16—by turning the distributor 18 by means of the handle 22—can be connected either to the outlet 23′ of the steam-supply duct 23 or to the outlet 24′ of the hotwater supply duct 24.

The tightness of the "disc" is secured by a stuffing box 25, in which the stuffing material is pressed by the gland 26. The angular stroke of the distributor 18 is advantageously confined by a stop 28 (Figs. 3 and 4) screwed in the side wall of the body 1 and projecting into a segment-shaped groove formed in the thickness of the distributor 18. In this manner all outside stops are avoided.

Special attention has been paid to the snouts 30 delivering the coffee infusion into the cups. The infusion delivery advantageously comprises a block 31 screwed on the collector 7 and on which the bent tubular arms 32 with nozzles 33 fixed thereon are soldered. The number of snouts may of course be varied.

It is understood that such details as refer to shape, dimensions, arrangement, application, materials employed, etc., may differ within the spirit and scope of the invention.

Having now described my invention and how the same is to be carried out, what I claim as my invention is:

1. A device of the class described comprising an arm having a cup carried by one end, a circular carrier in the cup, a filter having an annular flange adapted to rest upon the carrier, a collector threaded in the cup and engaged with the carrier, said collector when in its operative position serving to clamp the flange of the filter between a wall of the cup and the carrier, said arm having ducts therein for conducting fluid into the cup, and means carried by the collector for discharging the contents thereof.

2. A device of the class described comprising an arm having a cup upon one end, a filter in the cup having an annular flange carried thereby, a ring-like carrier, a filter, a collector adjustably threaded in the cup for engagement with the carrier and operable to clamp the flange of the filter between the carrier and a wall of the cup.

3. A device of the class described comprising an arm having a cup upon one end, a filter in the cup, a carrier for the filter, a collector adjustably threaded in the cup and engaged with the carrier to maintain the filter in fixed position within the cup, a block threaded on the collector and having spouts carried thereby for discharging the contents of the collector, said arm having fluid conducting ducts therein and communicating with the cup, and means associated with the arm for controlling the passage of fluid through the ducts.

ANGELO TORRIANI.